(12) United States Patent
DePaso

(10) Patent No.: US 9,315,333 B2
(45) Date of Patent: Apr. 19, 2016

(54) SYSTEM AND METHOD FOR MEASURING, MAPPING, AND MODIFYING THE TEMPERATURE OF A CONVEYOR

(75) Inventor: Joseph M. DePaso, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 509 days.

(21) Appl. No.: 13/817,523

(22) PCT Filed: Sep. 9, 2011

(86) PCT No.: PCT/US2011/051013
§ 371 (c)(1),
(2), (4) Date: Feb. 18, 2013

(87) PCT Pub. No.: WO2012/034029
PCT Pub. Date: Mar. 15, 2012

(65) Prior Publication Data
US 2013/0146672 A1    Jun. 13, 2013

Related U.S. Application Data

(60) Provisional application No. 61/381,338, filed on Sep. 9, 2010.

(51) Int. Cl.
| | |
|---|---|
| F25D 13/06 | (2006.01) |
| F24D 19/10 | (2006.01) |
| G06F 19/00 | (2011.01) |
| B65G 43/00 | (2006.01) |
| G01K 1/02 | (2006.01) |
| G01K 13/06 | (2006.01) |
| G06F 15/00 | (2006.01) |

(52) U.S. Cl.
CPC ............. *B65G 43/00* (2013.01); *G01K 1/024* (2013.01); *G01K 13/06* (2013.01); *G06F 15/00* (2013.01); *G01K 2213/00* (2013.01)

(58) Field of Classification Search
CPC ....... B65G 43/00; G01K 13/06; G01K 1/024; G01K 2213/00
USPC ......................................... 236/91 D; 702/150
See application file for complete search history.

(56) References Cited

U.S. PATENT DOCUMENTS

| | | | | |
|---|---|---|---|---|
| 3,917,774 | A | * | 11/1975 | Sagane et al. ................ 264/46.2 |
| 5,030,409 | A | * | 7/1991 | Hisanaga et al. ............. 264/556 |
| 5,148,100 | A | | 9/1992 | Sekiba |
| 5,951,895 | A | * | 9/1999 | Green et al. .................. 219/388 |
| 6,113,967 | A | * | 9/2000 | Green et al. .................. 426/523 |
| 6,391,127 | B1 | * | 5/2002 | Wyatt-Mair et al. .......... 148/551 |
| 6,522,939 | B1 | | 2/2003 | Strauch et al. |
| 7,213,967 | B2 | | 5/2007 | Simunovic et al. |

(Continued)

*Primary Examiner* — M. Alexandra Elve
*Assistant Examiner* — Henry Crenshaw
(74) *Attorney, Agent, or Firm* — James T. Cronvich

(57) ABSTRACT

Conveying system and method for sensing and controlling the surface temperature of a conveyor transporting articles through a process that incidentally changes the temperature of the conveyor. The conveyor system includes a conveyor such as a transport belt having temperature sensors embedded in the belt at spaced locations along its length. Transmitters embedded in the belt transmit temperature readings made by the sensors to a remote controller. The remote controller controls a temperature modification unit in the belt's conveyor path that restores the temperature of the belt to an optimum range for the processing of the articles. The controller creates a temperature map of at least a portion of the conveyor path.

16 Claims, 2 Drawing Sheets

(56) References Cited

U.S. PATENT DOCUMENTS

| | | |
|---|---|---|
| 7,635,060 B2 | 12/2009 | Lagneaux |
| 7,740,128 B2 * | 6/2010 | Wallace et al. ............... 198/618 |
| 2003/0023337 A1 * | 1/2003 | Godfrey et al. ............... 700/109 |
| 2008/0178613 A1 * | 7/2008 | Smith ............................... 62/62 |
| 2008/0223510 A1 * | 9/2008 | Mizuno et al. ................ 156/209 |
| 2009/0002148 A1 * | 1/2009 | Horvitz ......................... 340/514 |
| 2009/0044582 A1 * | 2/2009 | Yadav .......................... 71/64.07 |
| 2009/0087521 A1 * | 4/2009 | Belanger et al. ................ 426/94 |
| 2009/0135019 A1 | 5/2009 | Smith |
| 2009/0194391 A1 * | 8/2009 | Lagneaux ................ 198/810.04 |

* cited by examiner

SYSTEM AND METHOD FOR MEASURING, MAPPING, AND MODIFYING THE TEMPERATURE OF A CONVEYOR

BACKGROUND

The invention relates generally to power-driven conveyors conveying articles through a process and more particularly to conveyors with embedded temperature sensors used to establish, maintain, or restore the temperature of the conveyors to a predetermined range ahead of, internal to, or behind the process.

For many continuous processing devices, such as ovens, cookers, coolers, freezers, heaters, dryers, proofers, and shrink-wrap tunnels, the temperature of the continuous transport medium, or conveyor, is critical to the processing of articles conveyed on the conveyor. The temperature of the continuous conveyor itself can affect the process. For example, if a conveyor is too warm or too cold when it enters a cooker, proofer, heater, dryer, cooler, or freezer, the ultimate quality of the products conveyed on the conveyor will be degraded. In the case of shrink-wrap tunnels, there is an optimum surface temperature range for the conveyor. If the temperature of the conveyor is too low, the conveyor may be pumping energy unnecessarily out of the tunnel. Worse, the shrink-wrap film may not shrink correctly around the package being transported. If the temperature of the conveyor is too high, the film may stick to the conveyor itself.

SUMMARY

These shortcomings are overcome by a conveying system embodying features of the invention. One version of such a conveying system comprises a conveyor arranged to convey articles through a process along a processing path segment of a conveyor path and to return along a return path segment of the conveyor path. The temperature of the conveyor changes along the processing path segment as the articles undergo the process. The conveyor has a contact surface that contacts the articles being conveyed along the processing path segment. Temperature sensors mounted in the conveyor at spaced apart locations make temperature measurements of the contact surface of the conveyor at the spaced apart locations. A temperature modification unit disposed along the conveyor path uses the temperature measurements to modify the temperature of the contact surface of the conveyor to within a predetermined range of temperatures.

In another aspect of the invention, a method for controlling the temperature of a conveyor conveying articles through a process comprises: (a) advancing articles supported on a conveyor along a processing path segment of a conveyor path, wherein the articles undergo a process that changes the temperature of the conveyor along the processing path segment; (b) measuring the temperature of the conveyor with a plurality of temperature sensors mounted in and advancing with the conveyor and producing temperature measurements; and (c) using the temperature measurements to modify the temperature of the conveyor as the conveyor advances along the conveyor path to adjust the temperature of the conveyor to a temperature within a predetermined range of temperatures.

In yet another aspect of the invention, a method for producing a dynamic temperature map of a process comprises: (a) making measurements of a condition of a process with an arrangement of sensors disposed at predetermined relative positions on a conveyor belt advancing along a conveyor path through a process; (b) determining the absolute positions of the sensors along the conveyor path; (c) collecting the measurements from the sensors; and (d) correlating the measurements with the absolute positions along the conveyor path to produce a dynamic map of the condition along the conveyor path.

BRIEF DESCRIPTION OF THE DRAWINGS

These aspects and features of the invention are better understood by referring to the following description, appended claims, and accompanying drawings, in which:

DETAILED DESCRIPTION

Figure 1:
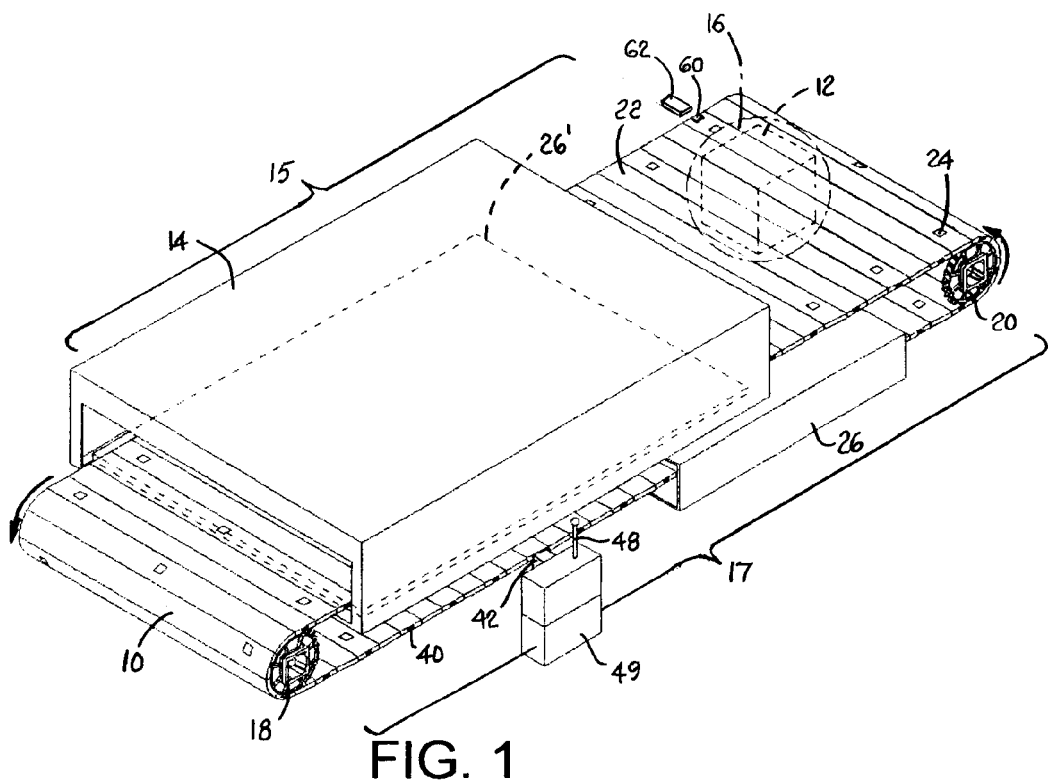
FIG. 1 is an isometric view of a conveyor system embodying features of the invention.

One version of a conveyor system embodying features of the invention is shown in FIG. 1. A conveyor, shown in this example as a transport belt 10, carries articles 12 through a shrink-wrap tunnel 14 along a processing path segment 15 of the belt's endless conveyor path. A film 16 is applied to each article upstream of the tunnel, which has hot air blowers. The transport belt 10 advances the film-wrapped articles continuously through the tunnel 14. The film 16 is thermally shrunk around the articles 12 by the hot air in the tunnel. While the articles are undergoing the wrap-shrinking process in the tunnel, the portion of the transport belt 10 in the tunnel is also heated. After exiting the tunnel, the articles are conveyed off the end of, or otherwise removed from, the transport belt. After rounding drive sprockets 18, the transport belt 10 follows a return path segment 17 on its way back around idle sprockets 20 to the processing path segment 15. No articles ride on the belt on the return path segment.

For the shrink-wrap process to work properly, the surface temperature of the transport belt 10 must be within a predetermined optimum range. If the temperature of the outer contact surface 22 of the belt is too cold, the transport belt can "pump" energy unnecessarily out of the tunnel 14. And even worse, the film 16 may not shrink correctly around the package being transported. If the temperature of the contact surface 22 is too hot, the film can stick to the transport belt itself. Temperature sensors 24, such as thermistors, embedded in the belt at spaced apart locations along its length and optionally across its width continuously measure the belt's temperature on its journey around the belt path. In this example, which shows a modular plastic conveyor belt constructed of rows of hinged modules, one temperature sensor is shown mounted in each belt row with the positions staggered across the width of the belt from row to row. The temperature sensors allow the belt temperature to be tracked over both the continuous process along the processing path segment 15 and the belt return over the return path segment 17. A temperature modification unit 26 in the return path segment 17 cools the transport belt 10 and restores its contact-surface temperature to within the optimum range for the process before the belt reaches the processing path segment 15. The temperature modification unit 26 may be in the form of a cooling tunnel as shown, ambient-air blowers, or other apparatus that conduct heat from the transport belt. Alternatively, a temperature modification unit 26' disposed along the processing path segment 15 may be used to adjust the temperature of the transport belt even as the belt's temperature is being affected by the treatment of the articles undergoing the shrink-wrap process. For example, such a temperature modification unit 26' could include cooling means, such as a cooling surface contacting the underside of the transport belt in the tunnel, arranged to draw heat from the belt itself with minimal cooling of the articles undergoing the shrink-wrap heating process.

Figure 2:
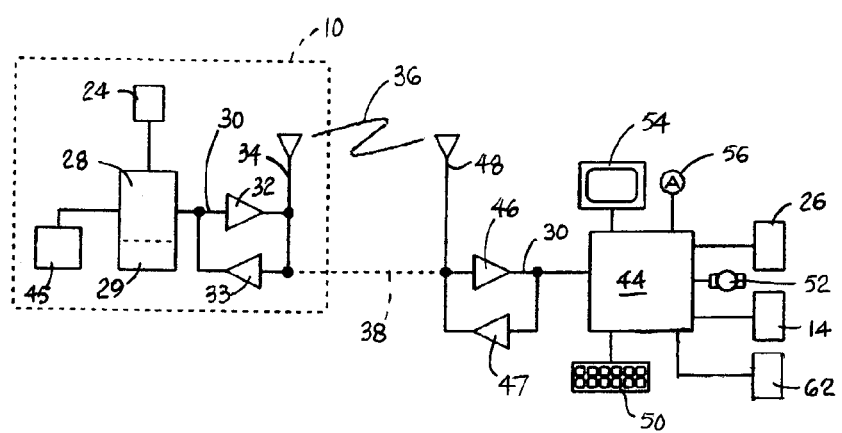
FIG. 2 is a block diagram of the conveyor system of FIG. 1.

The temperature measurements provided by the embedded temperature sensors 24 are used to control the temperature modification units 26 as shown in FIG. 2. Each temperature sensor is connected to a logic circuit 28 embedded in the transport belt 10. One or more temperature sensors 24 may be connected to each logic circuit, which may be realized by a programmed microcontroller or by hardwired logic elements. Conventional signal-conditioning circuit components, such as buffers, amplifiers, analog-to-digital converters, and multiplexers, may be interposed between the temperature sensors and the logic circuit. The logic circuit may also include a unique address or other identifying indicia to correlate the temperature measurements with a specific sensor position on the transport belt. The identifying indicia and the temperature measurements may be stored in one or more memory elements 29. The temperature measurements are converted into temperature signals 30 that are transmitted by a transmitter 32. The transmitter may be a wireless transmitter transmitting wirelessly via an antenna 34 over a wireless communication link 36 or over an ohmic connection 38 between a conductive contact 40 on the outside of the belt 10 and a brush 42 in conveyor structure along the side of the belt, as in FIG. 1. A receiver 33 may also be connected to the logic circuit to receive command and control signals from a remote controller 44, i.e., a controller not located on or in the transport belt. All the embedded components may be powered by a power source 45, such as one or more battery cells, housed together in a cavity in the belt. Alternatively, the power source 45 may be an energy harvester harvesting energy from vibratory motion or articulation of the conveyor, thermal gradients, or other energy-producing effects inherent in the process or conveyance. The embedded power source 45 may alternatively be powered by induction or by RF charging as it recirculates past an external charging device 49, as in FIG. 1.

A remote receiver 46 receives the temperature signals 30 via an antenna 48 over the wireless communication link 36 or over the ohmic connection 38 from the receiver 33 embedded in the transport belt. The receiver 46 sends the temperature signals to the remote controller 44. A transmitter 47 connected between the controller 44 and the antenna 48 or the ohmic connection 38 may be used to send command and control signals to the belt-borne sensor circuits. An operator input device 50 connected to the controller 44 may be used to input temperature-range settings to the controller corresponding to optimum range of the contact-surface temperature of the belt. From the settings and the temperature measurements of the portion of the belt in the temperature modification unit, the controller adjusts the temperature modification unit 26 to restore the contact-surface temperature of the transport belt to within the optimum range for the process. The controller 44 may also be used to control the operation of the heat-shrink tunnel 14 or the speed of the motor 52 driving the drive sprockets. A video display 54 may be used to monitor system operating conditions and settings or display alarm conditions. A more clearly visible or audible alarm 56 may also be used by the controller to warn of irregularities in the process. The controller may be a programmable logic controller, a laptop, a desktop, or any appropriate computer device.

Figure 3:
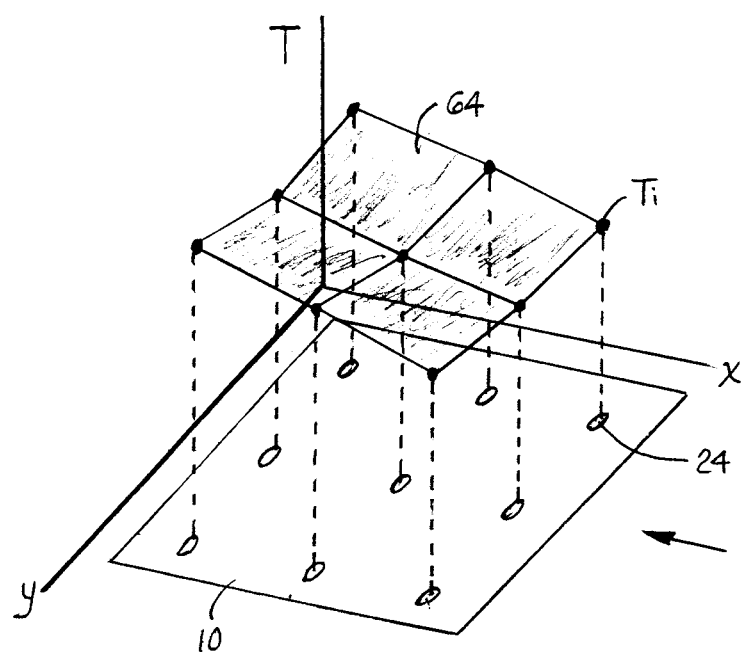
FIG. 3 is a pictorial illustration of an exemplary temperature map of a portion of a conveyor system as in FIG. 1.

The controller may also be used to produce a dynamic temperature map of the belt from the temperature measurements and position information of the sensors. One way to determine the positions of the temperature sensors is with a marker 60, such as a colored spot or a magnet, on the belt at a predetermined position relative to the positions of all the uniquely identifiable temperature sensors. A marker detector 62, such as an optical device or a magnetic or proximity switch at a predetermined absolute position along the conveyor path, signals the controller 44 when the marker passes. With a priori knowledge of the relative positions of the uniquely identifiable temperature sensors on the belt relative to the marker and with knowledge of the speed of the belt, the controller can tie the positions of all the temperature sensors to the position of the marker and dynamically estimate the absolute positions of all the temperature sensors by dead reckoning until the marker 60 again passes the detector 62, at which time the positions can be refixed. That is just one example of associating an absolute position (i.e., a position relative to the conveyor path) to each of the temperature sensors to correlate a temperature measurement with a position along the belt at a certain time. Other ways of determining absolute positions with sensor-position detectors, such as multiple marker detectors along the conveyor path or multiple uniquely identifiable markers or cameras and visioning systems, may be used to create the dynamic map. If temperature sensors 24 are arranged in an array along the length and across the width of the conveyor belt in FIG. 3, which shows schematically a portion of the conveying belt 10, the controller can produce a dynamic temperature map of that portion or any other portion of the conveyor path as indicated by the three-dimensional snapshot 64 of the dynamic temperature map (the lightly shaded surface in FIG. 3), in which the vertical axis T indicates the temperature, the horizontal x axis extends along the conveyor path, and the horizontal y axis extends across the width of the conveyor belt. The temperature measurements of the sensors are indicated by the points Ti on the map. The temperature measurements Ti may be filtered as required. Temperatures between sensors are calculated by interpolation. The map can be updated as the temperature sensors move and new measurements are sampled. The map can be displayed on the video display 54 and used to monitor and control the operation of the system. For example, the map may show lower temperatures at the positions of temperature sensors beneath products. The lower temperature readings of the occluded sensors, which would lie outside a range of expected temperature readings, could be treated as artificial and ignored by the controller's control routine in controlling the operation of the system. And the map can be used to determine the positions of products on the conveyor belt. Similar maps of other conditions, such as belt tension, belt motion, and moisture, can be produced if sensors sensing those conditions are distributed throughout the conveyor belt.

Although the invention has been described in detail with respect to a preferred version, other versions are possible. For example, other process equipment that heats the articles and the conveyor may include cookers and proofers. And process equipment, such as freezers and coolers, that reduce the temperatures of the articles and the conveyor, may be used with temperature modification units that heat the conveyor in the return path segment to raise its temperature. And the temperature-modification elements may include, besides blowers, refrigeration coils, water showers, heating elements, and steam injectors, depending on the application. The conveyor may be the modular plastic conveyor belt described, a friction-driven or positively-driven flat belt, a slat conveyor, a flat-top chain, a train of carriers, or any conveyor that advances conveyed articles through the process. So, as these few examples suggest, the scope of the claims is not meant to be limited to the details of the example version used to describe the invention.

What is claimed is:

1. A conveying system comprising:
   a conveyor arranged to convey articles through a heating or cooling process along a processing path segment of a conveyor path and to return along a return path segment of the conveyor path, wherein the temperature of the conveyor changes along the processing path segment as the articles undergo the heating or cooling process, the conveyor including:
      a contact surface contacting the articles being conveyed along the processing path segment;
      a plurality of temperature sensors mounted in the conveyor at spaced apart locations to make temperature measurements of the contact surface of the conveyor at the spaced apart locations;
   a temperature modification unit disposed along a length of the conveyor path that uses the temperature measurements to modify the temperature of the contact surface of the conveyor so that the temperature of the contact surface in the procession path is within a predetermined range of temperatures with minimal effect on the temperatures of the articles undergoing the process along the processing path segment, the predetermined range of temperatures being those that are optimum for use in conjunction with the heating or cooling process.

2. A conveying system as in claim 1 wherein the process is selected from the group consisting of cooking, heating, proofing, cooling, freezing, drying, and shrink-wrapping.

3. A conveying system as in claim 1 wherein the conveyor is an endless transport belt.

4. A conveying system as in claim 1 wherein the conveyor includes a plurality of transmitters, each of the transmitters associated with one or more of the temperature sensors to transmit the temperature measurements of the associated temperature sensors off the conveyor.

5. A conveying system as in claim 4 further comprising a receiver remote from the conveyor and forming a communication link with the plurality of transmitters over which the temperature measurements from the plurality of transmitters are sent to the receiver.

6. A conveying system as in claim 5 wherein the communication link is a wireless link.

7. A conveying system as in claim 5 wherein the communication link is a mechanical connection.

8. A conveying system as in claim 1 further comprising a controller remote from the conveyor, the controller processing the temperature measurements from the plurality of temperature sensors and sending control signals to the temperature modification unit to control the temperature of the contact surface of the conveyor.

9. A conveying system as in claim 1 further comprising an alarm and a controller remote from the conveyor, the controller processing the temperature measurements from the plurality of temperature sensors and activating the alarm when the temperature measurements are greater than a predetermined maximum temperature for the process or are lower than a predetermined minimum temperature for the process.

10. A conveying system as in claim 1 wherein the process heats the conveyor and the temperature-modification unit cools the conveyor.

11. A conveying system as in claim 1 wherein the process cools the conveyor and the temperature-modification unit heats the conveyor.

12. A conveyor system as in claim 1 wherein the temperature modification unit is disposed along the return path segment to restore the temperature of the contact surface to within a predetermined range of temperatures before re-entry into the processing path segment.

13. A conveyor system as in claim 1 wherein the temperature modification unit is disposed along the processing path segment to maintain the temperature of the contact surface to within a predetermined range of temperatures while the articles are undergoing the process.

14. A method for controlling the temperature of a conveyor conveying articles through a process, comprising:
   advancing articles supported on a conveyor along a processing path segment of a conveyor path, wherein the articles undergo a heating or cooling process that changes the temperature of the conveyor along the processing path segment;
   measuring the temperature of the conveyor with a plurality of temperature sensors mounted in and advancing with the conveyor and producing temperature measurements;
   using the temperature measurements to modify the temperature of the conveyor as the conveyor advances along the conveyor path to adjust the temperature of the conveyor within so that the temperature of the conveyor is a predetermined range of temperatures with minimal effect on the temperatures of the articles undergoing the process along the processing path segment, the predetermined range of temperatures being those that are optimum for use in conjunction with the heating or cooling process.

15. The method of claim 14 comprising modifying the temperature of the conveyor along a return path segment of the conveyor path along which the conveyor is devoid of articles.

16. The method of claim 14 comprising modifying the temperature of the conveyor along the processing path segment while the articles are undergoing the process.

\* \* \* \* \*